United States Patent [19]

Taylor

[11] Patent Number: 4,992,484
[45] Date of Patent: Feb. 12, 1991

[54] POLYURETHANE SYSTEMS INCORPORATING ALKOXYLATED DIETHYLTOLUENEDIAMINE

[75] Inventor: Glenn A. Taylor, Allentown, Pa.

[73] Assignee: Air Products and Chemicals, Inc., Allentown, Pa.

[21] Appl. No.: 123,083

[22] Filed: Nov. 20, 1987

[51] Int. Cl.$^5$ .............................................. C08G 18/32
[52] U.S. Cl. .................................................... 521/167
[58] Field of Search ........................................ 521/167

[56] References Cited

U.S. PATENT DOCUMENTS

| | | | |
|---|---|---|---|
| 3,423,344 | 1/1969 | Odinak et al. | 260/2.5 |
| 3,580,869 | 5/1971 | Rhodes, Jr. et al. | 260/2.5 |
| 3,948,825 | 4/1976 | Pray | 260/2.5 AQ |
| 4,235,977 | 11/1980 | Frisch et al. | 521/166 |
| 4,243,759 | 1/1981 | Haas | 521/167 |
| 4,444,704 | 4/1984 | Hira et al. | 521/167 |
| 4,444,915 | 4/1984 | Grube | 521/131 |
| 4,517,383 | 5/1985 | Korczak et al. | 564/443 |
| 4,530,941 | 7/1985 | Turner et al. | 521/167 |
| 4,555,418 | 11/1985 | Snider et al. | 521/167 |
| 4,562,290 | 12/1985 | Korczak et al. | 564/399 |
| 4,581,386 | 4/1986 | Taylor et al. | 521/167 |
| 4,596,685 | 6/1986 | Markovs | 521/167 |

FOREIGN PATENT DOCUMENTS 1398185  6/1972  United Kingdom .

Primary Examiner—John Kight, III
Assistant Examiner—Dennis R. Daley
Attorney, Agent, or Firm—Russell L. Brewer; James C. Simmons; William F. Marsh

[57] ABSTRACT

This invention relates to crosslinker sytems for polyurethanes and a process for producing such polyurethane products. The polyurethanes are prepared by reacting an organic polyisocyanate with an organic compound having active Zerewitinoff hydrogen atoms, e.g., a polyol with an alkoxylated diethyltoluenediamine crosslinker. Improved properties can be achieved, such as, higher load-bearing at equivalent density; higher tear; and higher elongation.

2 Claims, No Drawings

POLYURETHANE SYSTEMS INCORPORATING ALKOXYLATED DIETHYLTOLUENEDIAMINE

TECHNICAL FIELD

This invention relates to polyurethane crosslinker systems.

BACKGROUND OF THE INVENTION

The manufacture of polyurethane elastomers, whether rigid, or flexible, and whether the foam is microcellular or macrocellular, and whether the cellular structure is either open or closed, is widely known. Rigid foams are used for insulation and structural apparatus while flexible foams have wide usage in applications requiring cushioning. Cushioning applications are found in furniture, bedding and seats and other padded or cushioned interior for automobiles.

Polyurethane foams are prepared by reacting a polyisocyanate with a polyol and a crosslinker, typically an aromatic diamine or multifunctional, short chain polyol, with added fillers, catalysts and blowing agents. Rigid foams will require a higher level of crosslinking agent, while the flexible foams will have a lesser crosslink density than the rigid foams. Several properties are required in polyurethane systems for flexible foam, and include processing characteristics of the polyurethane system itself to permit handling, blending of the components, and filling of the mold. Efforts are continually being made to produce higher load bearing systems at equal density or equal load bearing at a lower density. In addition, fast demold and cycle times, reduced scrap, good tensile strength and so forth are required. To meet these requirements, crosslinkers have been used in various concentrations and types. One set of goals is to produce higher load-bearing, tear and elongation values. Other goals are to have material which can be blended easily and require little to no crushing when open cell structure is desired.

Representative patents which show the production of both rigid and flexible foams utilizing a polyisocyanate, polyol and aromatic diamines as a crosslinker, including alkoxylated aromatic diamines are as follows:

British Patent No. 1,398,185 discloses a process for producing flexible polyurethane foams by reacting a polyisocyanate with a polyol and a crosslinker system comprising an aromatic diamine/alkylene oxide reaction product. Toluenediamine/propylene oxide reaction products are shown. These aromatic amine/alkylene oxide reaction products increase the hardness of the resulting foam without consuming a substantial amount of isocyanate.

U.S. Pat. No. 3,580,869 discloses a process for producing microcellular polyurethane foams by reacting toluenediisocyanate with a polyol and an aromatic diamine, as well as, a propoxylated aniline.

U.S. Pat. No. 4,444,915 and U.S. Pat. No. 4,555,418 disclose a rigid polyisocyanurate foam prepared from a polyisocyanate, a polyol and an alkoxylated alkylamine as a crosslinking agent.

U.S. Pat. No. 3,948,825 discloses a process for producing cellular polyurethane foams which utilizes a conventional urethane formulation crosslinked with a system consisting of an alkylene oxide of methylene dianiline and more specifically an ethylene oxide/propylene oxide adduct of methylene dianiline.

U.S. Pat. No. 4,243,759 and U.S. Pat. No. 4,562,290 disclose the use of alkoxylated toluenediamines as a crosslinking agent for polyurethane foam systems. Ethylene oxide and propylene oxide adducts of toluenediamine are suggested as being suitable candidates for the crosslinking system.

U.S. Pat. No. 4,517,383 discloses a use of an alkylene oxide adduct of aniline for reducing viscosity of an polyurethane foam formulation.

U.S. Pat. No. 3,423,344 discloses a process for producing polyurethane polyol systems containing hydroxyalkylated polyamines which enhance the compressive strength and resistance to volume change under humid and dry aging conditions. The polyol component of the polyurethane formulation comprises a hydroxyalkylated polyamine formed by reacting ethylene or propylene oxide with an amine equivalent of a polyamine such as methylene dianiline and a polyol.

U.S. Pat. No. 4,235,977 discloses the use of an alkoxylated isocyanurate in preparing microcellular polyurethanes.

SUMMARY OF THE INVENTION

This invention relates to a polyurethane crosslinker system for producing polyurethanes having outstanding properties by the reaction of a polyisocyanate, a polyol, and a crosslinking system comprising an alkoxylated diethyltoluenediamine. Some of the advantages associated with polyurethane systems containing alkoxylated diethyltoluenediamines include:

a polyurethane system having high cure rate;

a crosslinker system which permits one to reduce the foam density while maintaining load bearing;

a crosslinker system which permits increasing load bearing while maintaining foam density;

a polyurethane system having both a high tear strength and elongation;

a flexible polyurethane system having high initial air flow (cell openness).

a polyurethane system having acceptable viscosity for easy handling, by molders;

an alkoxylated aromatic diamine crosslinker systems which is compatible with many commercial resin blends; and, a polyurethane system having good green strength and improved flash retention.

DETAILED DESCRIPTION OF THE INVENTION

In the preparation of polyurethane systems of this invention an organic polyisocyanate is reacted with a polyol and crosslinked with a crosslinking system. Various preparation techniques are known and can be used. One technique is sometimes used for microcellular elastomers (i.e., shoe soles) or rigid foam involves forming a quasi-prepolymer by reacting a short chain polyol with the isocyanate and then synthesizing the polyurethane by injecting the organic polyisocyanate quasi prepolymer, polyol and crosslinking system into a mold simultaneously and reacting the mixture. A second technique used in the manufacture of polyurethane systems is the prepolymer technique wherein the organic polyisocyanate is first reacted with a polyol to form a prepolymer and then the prepolymer injected into a mold along with a crosslinking system for subsequent crosslinking of the resin. Another technique for flexible foam is called the 'one shot', wherein the hard segment, which enhances the load-bearing property, is made by radical polymerization of a monomer such as, acyrlonitrile or styrene or condensation polymerization of monomers such as hydrazine and toluenediisocyanate and subsequent stabilization in a base polyol. This polymer polyol is a 'PHD ' polyol. Another process for producing polyurethane elastomers is the reaction injection molding process wherein the reactants are pumped under high pressure into a mixing pressure and then forced into a mold.

Organic polyisocyanates which can be used in the manufacture of polyurethane systems typically are produced by the phosgenation of aromatic diamines or aliphatic amines. Examples of aromatic diisocyanates which can be utilized include toluene diisocyanate, typically as an 80/20 mixture by weight of the 2,4- and 2,6-toluene diisocyanate mix. Other isocyanates which can be used include methylene di(phenylisocyanate), toluidine diisocyanate, m-xylene diisocyanate, 1,5-naphthylene diisocyanate and others conventionally used in the manufacture of polyurethane systems. Aliphatic isocyanates can also be utilized in the manufacture of polyurethane systems and these representative isocyanates include hexamethylene-1,6-diisocyanate and tetramethylene-1,4-diisocyanate and so forth.

Other components utilized in the manufacture of polyurethane foam systems include organic compounds having at least two active Zerewitinoff hydrogen atoms, e.g. polyols which are, by and large long chain polyols having a molecular weight of from about 300–15,000 preferably 500–5000; they also comprise alkylene oxide reaction products of aliphatic diols and triols. Typically, the aliphatic oxides used in preparing the alkylene oxide reaction products include ethylene oxide, propylene oxide and butylene oxide, but primarily ethylene and propylene oxide or mixtures of the two. Typical polyols include polypropylene glycol and ethylene oxide capped polypropylene glycol. These alkylene oxide adducts are sometimes reacted with short chain diols such as ethylene glycol, propylene glycol, butanediol and triols such as trimethylol propane and hexane triol. Also, dimer acid-based polymers, e.g., adipate ethers of diols and triols and caster oil-polyol based systems can be used. The utilization of polyether and polyester polyols are well known and representative polyether and polyester polyols are shown in U.S. Pat. No. 4,555,418 and the subject matter is incorporated by reference.

The crosslinking system for the polyurethane formulation is based upon the use of an alkoxylated diethyl toluenediamine. One of the basic objections to the use of aromatic diamines was that they reacted too rapidly with polyurethane forming systems to permit injection of the formulation into a mold. In addition, they often resulted in increased shrinkage during the cure process. Hindered aromatic amines which had a longer pot life than nonhindered aromatic diamines were best suited for that type of processing. Even so, most of the hindered aromatic diamines were too reactive for foam formulation. Reactivity of the aromatic amines has been altered by forming alkylene oxide adducts of these aromatic diamines, e.g., the alkylene oxide adducts were formed by reacting an alkylene oxide, e.g., a $C_2$ to $C_6$ alkylene oxide with an aromatic diamine and thereby introduce aliphatic ether units into the amine. In this case, though, the aromatic diamine is diethyltoluenediamine, and the alkoxylated derivatives are represented by the formula:

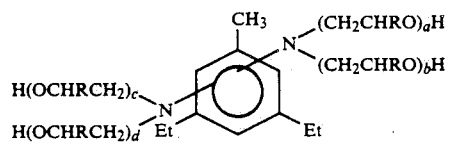

diethyltoluenediamine (2.4- and 2,6-isomers) with the ethyl groups (Et) in the 3 and 5 positions); wherein R is H or $CH_3$—and a, b, c, and d are integers with this sum being from 1–15. Preferably, the sum of a, b, c, and d ranges from 1.5–2.5.

Various alkylene oxides, e.g., ethylene oxide, propylene oxide, butylene oxide or mixtures can be reacted with the diethyltoluenediamines to produce the desired alkoxylated derivative. Often a mixture of two alkylene oxides is used instead of one. A mixture often produces different reactivities than either when used alone. Ethylene and propylene oxide are the preferred oxides for synthesis of the alkoxylated derivatives of diethyltoluenediamines. The mole ratio of alkylene oxide to diethyltoluenediamine should be sufficient to provide an average of about from 1 to 6 alkylene oxide units per mole of aromatic diamine and preferably 1.5–2.5 groups. The above tri alkylated aromatic diamine is suited for crosslinking purposes and has performance advantages over other nonhindered, hindered aromatic diamines, and alkoxylated derivates. Although it is somewhat slower in reactivity, it can be formulated over a wider range of conditions, and when reacted with ethylene or propylene oxide or mixtures, it provides for excellent performance.

The crosslinker formulation of alkoxylated diethyltoluenediamine is added to the urethane foam formulation at a level of from about 1 to 15% by weight, based on the polyol component. The weight % of alkoxylated aromatic diamine in the crosslinker formulation or system will range from about 1–8% by weight. The amount is often referred to as PHP or parts per hundred parts polyol by weight.

As with conventional polyisocyanate systems, catalysts which catalyze trimerization of isocyanates to form isocyanurates or catalyze the reaction of the isocyanate with hydroxyl groups in the polyol to form polyurethanes or catalyze the reaction of isocyanates with diamines to form polyureas can be employed. Catalysts are used in amounts recommended in the art, and examples of such catalysts include tertiary amines which are represented by triethylenediamine, triethylamine, N-methylmorpholine, N-ethylmorpholine, N,N-diethylethanolamine and the like.

The foam density of the products is regulated by techniques well-known in the art, and typically this control of density is exercised by regulating the amount of water present in the foam mixture or by using a blowing agent or combination of water an blowing agent. Common blowing agents include aliphatic hydrocarbons or halogenated hydrocarbons, e.g. butane, trichloromonofluoromethane, chlorotrifluoromethane and so forth.

Other additives used in the manufacture of polyurethane systems for specific purposes can be used in the practice of this invention, and these include flame retardants, stabilizers, cell regulators and so forth. An example of a cell regulator is a organosilicone polymer.

The following examples are intended to illustrate various embodiments of the invention and are not intended to restrict the scope thereof.

EXAMPLE 1

General Method For Preparation of Hydroxyethyldiethyltoluenediamine (HE-DETDA)

A 1,000 ml three-neck round bottom flask was charged with 178 grams (1 mole) of a mixture consisting of 80 parts by weight 3,5-diethyl-2,4-toluenediamine and 20 parts of a 3,5-diethyl-2,6-toluenediamine mixture. After charging the diethyltoluenediamine to the flask, 176 grams (2 moles) of ethylene carbonate were charged to the vessel and the contents stirred. The ethylene carbonate dissolved readily in the diethyltoluenediamine and a clear amber solution resulted. The contents were heated to a temperature of about 150° C. and at such time carbon dioxide evolution appeared. Heating was continued until the temperature reached about 260° C. during which time carbon dioxide gas evolution ceased. Approximately 1.7 cubic feet or 2.2 moles of carbon dioxide were recovered from the vessel.

At the completion of the reaction, a viscous, dark brown, glassy product was present in the vessel. The product was recovered by heating slightly to permit agitation. A vacuum was applied slowly until a pressure of 15 mm mercury was reached. The temperature was maintained at 110° C. and carbon dioxide withdrawn. After substantially all of the dissolved carbon dioxide was removed, the temperature was raised to approximately 127° C. and a distillate fraction collected. The distillate fraction constituted 11.2 grams material leaving a residue of approximately 250 grams of hydroxyethylated diethyltoluenediamine. Analytical test results showed the product had a hydroxyl number of 613 ml KOH/gram of material.

The percent distribution of ethylene oxide units was 0 moles 3%, 1 mole 13%, 2 moles 45%, 3 moles 33%, and 4 moles 6%.

EXAMPLE 2

Preparation of Hydroxypropyldiethyltoluenediamine (HP-DETDA)

The procedure of Example 1 was utilized except that propylene oxide was substituted for ethylene carbonate. Experimental procedures had shown there was essentially no difference in using either the carbonate or oxide form in producing the alkylene oxide derivatives. The reactor was purged with nitrogen and 96 pounds (243.7 mols) of a 3,5-diethyl-2,4- and 2,6-toluenediamine (80:20) mixture was added to the reactor. The contents were heated to 140° C. and the pressure adjusted to 5 psig. Then, a 56.3 pound quantity of propylene oxide was added incrementally and regulated so the pressure in the reactor did not exceed 60 psig. After all of the reactants were in the reactor, the reaction was continued, with agitation, for 2 hours. The reaction product was recovered by stripping residual propylene oxide from the reaction mixture under vacuum. The yield was 159 pounds of product with the percent of product having the following molar oxide substitution: 0 moles, 1.5%; 1 mole, 12.4%; 2 moles, 45.9%; 3 moles, 32.6% and 4 moles or greater, 7.7%.

EXAMPLE 3

Polyurethane HR Foam Formulation

Polyurethane foams were prepared in conventional hand mix manner. Table 1 compares several commercial hydroxyl terminated crosslinkers to hydroxyethyldiethyltoluenediamine (HE-DETDA) and hydroxypropyl diethyltoluenediamine (HP-DETDA).

TABLE 1

|  | Comparative | | | | | | | |
|---|---|---|---|---|---|---|---|---|
|  | A | B | C | D | E | F | G | H |
| Polyol 34 OH# (PHP) |  |  |  | 100 | | | | |
| Berole ® 313 (PHP) | — | 7.0 | — | — | — | — | — | — |
| Dianole ®-22 (PHP) | 13.5 | — | — | — | — | — | — | — |
| Quadrol ™ (PHP) | — | — | 7.0 | — | — | — | — | — |
| HE-TDA (PHP) | — | — | — | 5.0 | — | — | — | — |
| HE-TDA (PHP) | — | — | — | — | 7.3 | — | — | — |
| HP-DETDA-1.8 (PHP) | — | — | — | — | — | 4.0 | — | — |
| HE-DETDA-2.0 (PHP) | — | — | — | — | — | — | 4.0 | — |
| HP-DETDA-1.8 (PHP) | — | — | — | — | — | — | — | 4.0 |
| Density, (lb/ft$^3$) | — | — | 2.6 | 1.5 | 1.6 | 2.7 | 1.6 | 1.6 |
| IFD | | | | | | | | |
| 25% | 17 | 8 | 16 | 25 | 36 | 70 | 18 | 25 |
| 65% | 53 | 25 | 48 | 76 | 95 | 189 | 51 | 76 |
| SAG 65%/25% | 3.1 | 3.1 | 3.1 | 3.0 | 2.6 | 2.7 | 2.9 | 3.0 |
| Tensile (lb/in$^2$) | 7 | 8 | 16 | — | — | 15 | — | 22 |
| Elongation (%) | 139 | 101 | 115 | — | — | 98 | — | 176 |
| Tear (lb/in) | 2.5 | 1.4 | 1.1 | — | — | 1.5 | 1.6 | 2.3 |
| 50% HA (%) | — | — | — | 36 | 38 | 16 | — | 35 |
| Water (PHP) | 3.8 | 3.8 | 2.3 | 3.8 | 3.8 | 2.6 | 4.5 | 4.5 |
| Cell Size | Med | Med | Fine | Fine | Fine | Fine | Fine | Fine |
| Shrinkage[1] | G | G | P | P | P | G | G | G |

TABLE 1-continued

|  | Comparative | | | | | | | |
| --- | --- | --- | --- | --- | --- | --- | --- | --- |
|  | A | B | C | D | E | F | G | H |
| Collapse[2] | N | N | N | Y | Y | N | N | N |

G = Good (very slight shrinkage)
P = Poor (large amount of shrinkage)
N = Foam was stable; Y = Cell instability
Dianol®-22 is ethoxylated Biphenol A; CAS No. 901-44-0
Berol®-313 is the reaction product of 1 mole aminoethylethanolamine + 3 moles propylene oxide
Quadrol® is the reaction product of 1 mole ethylenediamine + 4 moles ethylene oxide
HE-TDA is the reacton product of 1 mole toluenediamine-(an 80%) 2,4 and -2,6 mixture and 4 moles ethylene oxide
HP-DETDA is the reaction product of 1 mole diethyltoluenediamine 80% -2,4 and 20% 2,6-; -2,6 and 1.8 moles propylene oxide (PO)
HE-DETDA is the reaction product of 1 mole diethyltoluenediamine 80% -2,4; and 20% -2,6- and 2.0 moles ethylene oxide (EO)
Polyol 34 OH# is a Glycine started polyproplene oxide polymer with 15 wt % Ethylene Oxide capping
IFD refers to indentation load deflection at 25% and 65% deflection
* HA 50% refers to 50% humid aging Table 1 shows that Hp-DETDA and HE-DETDA produces equal or higher property values to those in runs A-E at lower weight percent or molar use level. Runs A-E are comparative examples.

Table 1 shows that polyurethane foams formulated with hydroxyethyltoluenediamine (D,E) exhibited poor shrinkage characteristics. The Dianol™, Berol™, and Quadrol ™ alkoxylated amines required higher loadings to produce equivalent properties. Run H shows better processing for the crosslinkers of this invention over hydroxethyltoluenediamine in Run D. Run F shows improved properties for the crosslinker of this invention over commercial type hydroxyl crosslinker (See Run C).

EXAMPLE 5

Polyurethane Foams

Similar polyurethane foams to those in Example 3 were prepared in conventional manner utilizing the formulations as noted in Table 2. Table 2 compares several commercial amine terminated crosslinkers to hydroxyethyl- and hydroxypropyldiethyltoluenediamine. The HP-DETDA and HE-DETDA showed improved physical properties over methylene orthochlorodiamine (MOCA), diisopropanolamine (DIPA) and diisobutyl amino benzenediamine (Di-DABA). As can be gleaned from Table 2. Example E shows improved elongation, IFD, and tear over Example A at equal density. Example F shows improved IFD, tensile, and elongation over MOCA of Example B.

TABLE 2

|  | Comparative | | | | | | |
| --- | --- | --- | --- | --- | --- | --- | --- |
|  | A | B | C | D | E | F | G |
| Polyol 34 OH# (PHP) |  |  |  | 100 |  |  |  |
| DIPA (PHP) | 5.1 | — | — | — | — | — | — |
| MOCA (PHP) | — | 8.8 | — | — | — | — | — |
| Di-DABA (PHP) | — | — | 5.0 | — | — | — | — |
| TDI/MDI (PHP) | — | — | — | 10.5 | — | — | — |
| HP-DETDA-1.8 (PHP) | — | — | — | — | 4.0 | — | — |
| HE-DETDA-2.0 (PHP) | — | — | — | — | — | 4.0 | — |
| HP-DETDA-1.8 (PHP) | — | — | — | — | — | — | 4.0 |
| Density (lb/ft[3]) | 2.7 | 1.6 | 1.5 | 2.8 | 2.7 | 1.6 | 1.6 |

TABLE 2-continued

|  | Comparative | | | | | | |
| --- | --- | --- | --- | --- | --- | --- | --- |
|  | A | B | C | D | E | F | G |
| IFD |  |  |  |  |  |  |  |
| 25% | 65 | 19 | 15 | 16 | 70 | 25 | 18 |
| 65% | 173 | 39 | 36 | 45 | 189 | 76 | 51 |
| SAG (65%/25%) | 2.7 | 2.1 | 2.4 | 2.8 | 2.7 | 3.0 | 2.9 |
| Tensile (lb/in[2]) | 15 | 11 | 13 | 15 | 15 | 22 | — |
| Elongation (%) | 81 | 101 | 130 | 110 | 98 | 176 | — |
| Tear (lb/in) | 1.2 | 2.2 | 1.3 | 1.2 | 1.5 | 2.3 | 1.6 |
| 50% HA (%) | 15 | 38 | — | — | 16 | 35 | — |
| Water (PHP) | 2.6 | 3.8 | 4.3 | 2.3 | 2.6 | 4.5 | 4.5 |
| Cell size[1] | C | F | F | F | F | F | F |
| Shrinkage[2] | G | F | G | G | G | G | G |

C = Course Cells; F = Fine small cells
G = Good (slight shrinkage); F = Fair (small amount of shrinkage)
DIPA is Diisopropanolamine
Di-DABA is diisopropyldiaminobenzamide
MOCA is methylene bis(orthochlorophenylamine)
HP-DETDA is the reaction product of 1 mole diethyltoluenediamine-80% 2,4; 20% -2,6 and 1.8 moles proylene oxide
HE-DETDA is the reaction product of 1 mole diethyltoluenediamine-80% 2,4; 20% -2,6 and 2.0 mole ethylene oxide
NCO index is 102.

Example E shows at equal density the crosslinker of this invention produces standard foam having overall improved physical properties than an amine functional crosslinker. (See Example A.) Even using MDI at a 105 index produced foam of overall poorer physical properties to the crosslinker of this invention. Examples F and G show lower concentrations of crosslinker of this invention resulted in improved properties to amine functional crosslinkers. (See Examples B and C.)

EXAMPLE 5

High Resilient Foams

High resilient foams were prepared in conventional manner utilizing the formulations as noted in Example 3. Table 3 sets forth the results from testing. The NCO index was varied, and some were machine mixed. The Quadrol ™ crosslinker which was used as a control did not perform as well as in machine runs given in Examples F, G, and H. Example E shows lower density foams were produced at equal water for the HE-DETDA crosslinker compared to the commercial hydroxy terminated crosslinker Quadrol ™. (See Example A.)

TABLE 3

|  | A | B | C | D | E | F | G | H |
| --- | --- | --- | --- | --- | --- | --- | --- | --- |
| Polyol 34 OH# |  |  |  |  | 100 |  |  |  |
| Polymer Polyol (PHP) |  |  |  |  | 20 |  |  |  |
| HE-DETDA-2.0 | — | — | — | — | 5.0 | — | — | — |

TABLE 3-continued

|  | A | B | C | D | E | F | G | H |
|---|---|---|---|---|---|---|---|---|
| HE-DETDA-2.0 | — | — | — | — | — | 5.0 | — | — |
| HE-DETDA-2.0 | — | — | — | — | — | — | 2.5 | — |
| Quadrol TM | 7.5 | — | — | — | — | — | — | — |
| Quadrol TM | — | 7.5 | — | — | — | — | — | — |
| Quadrol TM | — | — | 7.5 | — | — | — | — | — |
| Quadrol TM | — | — | — | 2.5 | — | — | — | — |
| TDI/MDI (75:25) | — | — | — | — | — | — | — | 105 |
| Type of mixing | H | H | H | M | H | H | M | M |
| NCO Index | 102 | 74 | 74 | 102 | 102 | 102 | 100 | 105 |
| Temperature (°F) | 100 | 100 | 140 | 120 | 100 | 140 | 120 | 120 |
| Water (PHP) | 2.7 | 2.7 | 2.7 | 2.7 | 2.7 | 2.7 | 3.3 | 2.7 |
| Density (lb/ft³) | 4.29 | 4.53 | 4.59 | 2.60 | 3.96 | 3.70 | 2.14 | 2.75 |
| IFD |  |  |  |  |  |  |  |  |
| 25% | — | — | — | 16 | — | — | 19 | 16 |
| 65% | — | — | — | 48 | — | — | 55 | 45 |
| SAG (65%/25%) | — | — | — | 3.00 | — | — | 2.89 | 2.81 |
| CLD (psi) | 267 | 98 | split | — | 108 | 86 | — | — |
| Tensile (lb/in₂) | 20 | 20 | 19 | 15 | 19 | 17 | 16 | 15 |
| Elongation (%) | 60 | 77 | 79 | 109 | 92 | 85 | 113 | 110 |
| Tear (lb/in) | — | — | — | 1.14 | — | — | 1.69 | 1.23 |
| Extrusion (sec) | 44 | 65 | 57 | — | 49 | 44 | — | — |
| Gel (sec) | 52 | 68 | 61 | — | 60 | 55 | — | — |

H = Handmix at Sea Level; M = EMB machine runs at 8000 ft above sea level
HE-DETDA is the reaction product of 1 mole diethyltoluenediamine-2,4;-2,6 and 2.0 mole ethylene oxide
Quadrol ® is 1 mole ethylenediamine and 4 moles propylene oxide
TDI/MDI = 50:50 blend of 2,4-; 2,6- toluenediisocyanate and Polymer polyol is 22 wt % Acrylonitrile/styrene in a 34 OH# polyol (of 50:50)
Polyol 34 OH# is a glycine started polypropylene oxide polymer with 15 weight % ethylene oxide capping Examples A-D are hydroxyl function crosslinker derived from ethylenediamine and propylene oxide. Examples E-G are crosslinkers of this invention. Example H is using MDI as the hard segment. Examples A and E show at lower density crosslinker of this invention produces foam of overall improved physical properties. Examples G shows improved properties for machine runs, Example D a hydroxylpropylethylenediamine and Example G the crosslinker of this invention at equal concentrations. Example G has improved elongation and tear over the Example D Quadrol TM crosslinker at similar IFDs.

EXAMPLE 6

Polyurethane Foams polyurethane foams were prepared in conventional manner utilizing the formulations as noted in Table 4. Table 4 also sets forth the results from testing. This example was to demonstrate the effect of concentration of the crosslinker on selected physical properties.

TABLE 4

|  |  | A | B | C | D | E | F |
|---|---|---|---|---|---|---|---|
| Polyol 34 OH# |  |  |  | 100 |  |  |  |
| Quadrol TM 2% |  |  |  |  |  |  |  |
| HP-DETDA-1.8 |  | 2.0 | 4.0 | 6.0 | 8.0 | 10.0 | 12.0 |
| Density (lb/ft³) |  | — | 1.79 | 1.74 | 1.76 | 1.92 | 1.88 |
| IFD |  |  |  |  |  |  |  |
| 25% | C | 26.1 | 27.4 | 30.0 | 34.3 | 38.8 |  |
| 65% | O | 47.6 | 49.4 | 53.4 | 62.7 | 70.6 |  |
| SAG (25%/65%) | L | 2.87 | 2.90 | 2.90 | 2.94 | 2.91 |  |
| Tear (lb/in) | L | 1.90 | 1.78 | 1.83 | 2.19 | 2.23 |  |
| Tensile (lb/in²) | A | 17.9 | 15.5 | 17.5 | 20.7 | 19.9 |  |
| Elongation (%) | P | 149.7 | 141.9 | 142.0 | 141.3 | 136.4 |  |
| 50% HA | S | 26.1 | 29.5 | 33.4 | 36.6 | 39.7 |  |
| Flow | E | 1.18 | 2.33 | 2.04 | 1.33 | 1.80 |  |
| Rebound |  | 44.0 | 43.8 | 42.8 | 41.9 | 41.9 |  |

HP-DETDA is the reaction product of 1 mole diethyl-80% 2,4 and 20% 2,6-toluenediamine, and 1.8 moles proylene oxide.
Flow = 1.0 is best; 2.50 is worst.
50% HA refers to humid aging.

EXAMPLE 7

Polyurethane Formulation Testing

Polyurethane HR foams were prepared in conventional manner utilizing the formulations as noted in Table 5. Table 5 sets forth the results from testing. The HP-DETDA crosslinker of this invention shows improved tear, elongation, and air flow (Examples B, C) as compared to the commercial diisopropanolamine crosslinker of Example A.

TABLE 5

|  | A | B | C |
|---|---|---|---|
| Polyol 34 OH# |  | 100 |  |
| HP-DETDA - 2.0 | 0 | 6 | 8 |
| DIPA | 6 | 0 | 0 |
| Water |  | 2.6 |  |
| Density (lbs/Ft³) | 2.6 | 2.7 | 2.6 |
| IFD |  |  |  |
| 65% | 138 | 111 | 133 |
| 25% | 51 | 41 | 48 |
| SAG (65%/25%) | 2.7 | 2.7 | 2.8 |
| Tear (lb/in) | 1.0 | 1.5 | 1.6 |
| Tensile (lb/in) | 16.9 | 16.3 | 15.5 |
| Elongation (%) | 90 | 112 | 95 |
| Compression Set (%) | 4.4 | 6.6 | 7.8 |
| 50% HA Set (%) | 18.7 | 19.4 | 22.3 |
| Air Flow (Ft³/min) | 3.0 | 4.2 | 4.0 |
| Green Strength | Poor | Fair | Good |

¹DIPA is diisopropanolamine

Examples B and C show higher tear, elongation, compression set and air flow at lower molar concentrations for the crosslinker of this invention with respect to an amine functional commercial crosslinker.

EXAMPLE 8

Polyurethane Foams

Polyurethane foams were prepared in conventional manner utilizing the formulations as noted in Table 4.

TABLE 6

|  | A | B | C | D | E | F | G | H | I |
|---|---|---|---|---|---|---|---|---|---|
| Polyol 34 OH# |  |  |  |  | 100 |  |  |  |  |
| HP-DETDA - 1 moles | 10 | 1.2 | — | — | — | — | — | — | — |
| HP-DETDA - 2 moles | — | 3.8 | 10 | 8 | 6 | 4 | 2 | — | — |
| HP-DETDA - 3 moles | — | — | — | 2 | 4 | 6 | 8 | 10 | — |
| E-9151 | — | 5.0 | — | — | — | — | — | — | 10 |
| Density (lbs/Ft$^3$) | 2 | 1.8 | 2.0 | 2.0 | 2.0 | 2.0 | 2.0 | 2.0 | 2.0 |
| IFD |  |  |  |  |  |  |  |  |  |
| 65% | 77 | 129 | 76 | 74 | 68 | 74 | 74 | 74 | 85 |
| 25% | 25 | 45 | 28 | 26 | 24 | 26 | 27 | 26 | 32 |
| SAG (65%/25%) | 2.80 | 2.97 | 2.71 | 2.85 | 2.83 | 2.85 | 2.74 | 2.85 | 2.66 |
| Tear (lb/in) | 2.0 | 1.8 | 3.3 | 3.5 | 3.1 | 3.1 | 3.0 | 2.6 | 1.7 |
| Tensile (lb/in$^2$) | 15 | 18 | 19 | 20 | 21 | 22 | 18 | 20 | 17 |
| Elongation (%) | 90 | 96 | 180 | 174 | 184 | 182 | 178 | 184 | 104 |
| 50% HA Set (%) | 31 | 17 | 31 | 32 | 30 | 32 | 30 | 31 | 31 |
| Air Flow (Ft$^3$/min) | 0.9 | 1.4 | 1.2 | 0.9 | 1.0 | 0.8 | 1.1 | 1.3 | 0.9 |
| Flow | 1.8 | 1.1 | 1.5 | 2.1 | 2.0 | 2.3 | 2.4 | 2.4 | 1.0 |
| Shrinkage | 2.5 | 0.5 | 2.0 | 2.0 | 1.5 | 2.0 | 2.0 | 2.5 | 0.9 |
| Green Strength | P | G | G | G | G | F | F | P | G |

E = E9151 is a polymer polyol (amine stabilized) sold by Mobay Corp.
G = Good, F = Fair, P = Poor
Flow [0 (best) - 3.0 (worst)]

Table 6 sets forth the results from testing. Table 6 shows reaction products of 1.0 mole propylene oxide and 3.0 mole propylene oxide produce overall slightly poorer foams than 2.0 moles propylene oxide and mixtures using a majority of the 2.0 molar propylene oxide derivatives. Example A shows the benefits of utilizing partial replacement of polymer polyol in standard formulations with the crosslinker of this invention.

Examples F, G, and H show poorer green strength than Examples C, D, and E. Example C produced the best flow characteristics. Example C also produced foam with the highest overall IFD property. When E-9151 was used, example 1, higher IFD can be obtained, but inferior tear, and elongation are obtained, other properties are similar. A combination of polymer polyol and crosslinker of this invention produced foam improved processing flow, shrinkage processing properties with improved IFD's. The presence of a 2 molar adduct of diethyltoluenediamine produced standard foam with overall improved properties.

EXAMPLE 10

Effect of Crosslink/Chain Extender Ratio

Polyurethane foams were prepared in conventional manner utilizing the formulations as noted in Table 7. Examples F and G gives values for products made with a commercial polymer polyol, "PHD", and in all cases the crosslinker HE-DETDA-1.8 of this invention showed improved stability at the final bleeder port. This is the result of crosslink/chain extender ratio which is controlled by the addition of alkylene oxide to the amines on diethyltoluenediamine. Table 7 illustrates the effect of alkylene oxide addition on the amine.

TABLE 7

|  | A | B | C | D | E | F | G |
|---|---|---|---|---|---|---|---|
| NCO Index |  |  |  | 102 |  |  |  |
| Polyol 34 OH |  |  |  | 100 |  |  |  |
| HP-DETDA-1.8 moles PO |  |  |  |  |  |  |  |
| E-9151 *PHD Polymer Polyol |  |  |  | 20 |  |  |  |
| 33LV/BL-11 | — | — | — | — | 0.5/0.15 | 0.5/0.15 | 0.5/0.15 |
| X-8214 | 0.7 | 0.7 | — | — | — | — | — |
| X-542 | — | — | 0.7 | 0.7 | — | — | — |
| PREMIX |  |  |  | 26° C. |  |  |  |
| POUR TEMP. |  |  |  | 60° C. |  |  |  |
| EXTRUSION | 25 | 24 | 26 | 26 | 22 | 23 | 22 |
| CUP WT. | 80.6 | 77.2 | 70.8 | 75.7 | 75.2 | 73.5 | 75.0 |
| PIP WT. | 28.7 | 30.3 | 35.4 | 30.4 | 21.2 | 33.5 | 35.5 |
| PAD WT. | 117.3 | 118.3 | 121.2 | 121.8 | 119.2 | 106.9 | 109.3 |
| STABILITY RATING |  |  |  |  |  |  |  |
| [0 (GOOD) - 3 (BAD)] |  |  |  |  |  |  |  |
| #1 | 0.8 | 0.8 | 0.5 | 0.6 | 0.7 | 0.6 | 0.6 |
| #2 | 0.4 | 0.4 | 0.4 | 0.3 | 0.2 | 1.0 | 0.3 |
| #3 | 0.4 | 0.3 | 0.3 | 0.4 | 0.2 | 1.5 | 1.0 |
| TOTAL | 1.6 | 1.6 | 1.2 | 1.2 | 1.1 | 3.1 | 1.9 |

X-8214 is a commercial polyurethane amine catalyst sold by Air Products and Chemicals, Inc.
X-542 is a commercial polyurethane amine catalyst sold by Air Products and Chemicals, Inc.

TABLE 8

|  | A | B | C | D | E | F |
|---|---|---|---|---|---|---|
| Polyol 34 OH# |  |  | 100 |  |  |  |
| HP-DETDA-1.8 | 2.0 | 4.0 | 6.0 | 8.0 | 10.0 | 12.0 |
| Density (lb/ft$^3$) | — | 1.79 | 1.74 | 1.76 | 1.92 | 1.88 |
| IFD |  |  |  |  |  |  |
| 25% | C | 26.1 | 27.4 | 30.0 | 34.3 | 38.8 |
| 65% | O | 47.6 | 49.4 | 53.4 | 62.7 | 70.6 |
| SAG (25%/65%) | L | 2.87 | 2.90 | 2.90 | 2.94 | 2.91 |
| Tear (lb/in) | L | 1.90 | 1.78 | 1.83 | 2.19 | 2.23 |
| Tensile (lb/in$^2$) | A | 17.9 | 15.5 | 17.5 | 20.7 | 19.9 |
| Elongation (%) | P | 149.7 | 141.9 | 142.0 | 141.3 | 136.4 |
| 50% HA (%) | S | 26.1 | 29.5 | 33.4 | 36.6 | 39.7 |
| Flow | E | 1.18 | 2.33 | 2.04 | 1.33 | 1.80 |

TABLE 8-continued

| | A | B | C | D | E | F |
|---|---|---|---|---|---|---|
| Rebound | — | 44.0 | 43.8 | 42.8 | 41.9 | 41.9 |

1. HP-DETDA is the reaction product of 1 mole 80% 3,5-diethyl-2,4 and 20% 2,6-toluenediamine; and 1.8 moles propylene oxide
2. Flow = 1.0 is best; 2.50 is worse
3. Polyol 34 OH# is a glycine started polypropylene oxide polymer with 15% ethylene oxide cappiig.
4. Concentrations are parts per hundred polyol (PHP).
5. NCO index is 102.

EXAMPLE 11

Effect of Crosslinker Concentration

Polyurethane foams were prepared in conventional manner utilizing the
formulations as noted in Table 8.

Table 8 shows a wide concentration ranging from 2-12 parts crosslinker which produce useful polyurethane foam material.

What is claimed is:

1. In a polyurethane foam formulation comprising an organic polyisocyanate, polyol, and cross-linker system, the improvement which comprises utilizing as said polyol, a polymeric polyol having a molecular weight of from about 300 to 15,000, and as said cross-linker, an ethoxylated or propoxylated diethyltoluenediamine having an average number of ethylene oxide or propylene oxide units from 1.5-2.5 in said ethoxylated or propoxylated diethyltoluenediamine and said ethoxylated or propoxylated diethyltoluenediamine is present in an amount from 1 to 15% by weight of the polyol.

2. In a process for the manufacture of a polyurethane foam system which comprises reacting an organic polyisocyanate, a polyether polyol having a molecular weight from about 300–5,000 and an alkoxylated aromatic diamine cross-linker, the improvement which comprises utilizing as said cross-linker an ethoxylated or propoxylated diethyl toluenediamine having an average number of ethylene oxide or propylene oxide units from 1.5 to 2.5 per mole of diethyltoluenediamine and said ethoxylated or propoxylated diethyltoluenediamine is present in an amount from 1–15% by weight of the polyol.

* * * * *